United States Patent
Kadam et al.

(10) Patent No.: US 12,461,948 B2
(45) Date of Patent: Nov. 4, 2025

(54) METHOD, APPARATUS, AND COMPUTER PROGRAM PRODUCT FOR MAP DATA CONFLATION

(71) Applicant: HERE GLOBAL B.V., Eindhoven (NL)

(72) Inventors: Nileshkumar Kadam, Pune (IN); Xiang Liu, Berlin (DE); Ricky Singh, Assam (IN); Jivitesh Sharma, Haryana (IN); Ganesh Singadkar, Aurangabad (IN)

(73) Assignee: HERE GLOBAL B.V., Eindhoven (NL)

( * ) Notice: Subject to any disclaimer, the term of this patent is extended or adjusted under 35 U.S.C. 154(b) by 265 days.

(21) Appl. No.: 17/934,900

(22) Filed: Sep. 23, 2022

(65) Prior Publication Data
US 2024/0104121 A1    Mar. 28, 2024

(51) Int. Cl.
G06F 16/29    (2019.01)
G06F 16/28    (2019.01)
H04W 4/02    (2018.01)

(52) U.S. Cl.
CPC .......... G06F 16/29 (2019.01); G06F 16/285 (2019.01); H04W 4/025 (2013.01)

(58) Field of Classification Search
CPC ....... G06F 16/285; G06F 16/29; H04W 4/025
See application file for complete search history.

(56) References Cited

U.S. PATENT DOCUMENTS

2019/0147331 A1*  5/2019  Arditi .................... G06V 20/58
                                                           706/20
2021/0150874 A1*  5/2021  Turano ................ H04L 12/2809
(Continued)

FOREIGN PATENT DOCUMENTS

CN    111435450 A    7/2020
CN    112818071 A    5/2021
(Continued)

OTHER PUBLICATIONS

Burgard, W., "Introduction to Mobile Robotics: SLAM—Landmark-Based FastSLAM", Albert-Ludwigs-Universität Freiburg, (2017), 36 pages.
(Continued)

*Primary Examiner* — Andrea C Leggett
(74) *Attorney, Agent, or Firm* — ALSTON & BIRD LLP (57) ABSTRACT

A method is provided automatically creating map objects from data from various sources gathered within a geographical area using data aggregation and conflation. Methods may include: receiving observation data associated with a geographic area; identifying at least one observed object within the observation data, the at least one observed object including an observed location and an observed object type; determining at least one confidence score for the at least one observed object; estimating similarity between the at least one observed object and at least one other observed object; merging the at least one observed object and the at least one other observed object; conflating the at least one observed object and the at least one other observed object to obtain a conflated object; providing for storage of the conflated object; and providing for at least one of navigational guidance or at least semi-autonomous vehicle control using the stored, conflated object.

20 Claims, 6 Drawing Sheets

(56) References Cited

U.S. PATENT DOCUMENTS

2021/0215489 A1* 7/2021 Zhang ............... G01C 21/3602
2021/0374965 A1* 12/2021 Richter .................. G06N 3/08

FOREIGN PATENT DOCUMENTS

| CN | 113259900 B | 8/2021 |
| CN | 114234995 A | 3/2022 |
| EP | 3 373 166 A1 | 9/2018 |

OTHER PUBLICATIONS

Li et al., "An Optimisation Model for Linear Feature Matching in Geographical Data Conflation", International Journal of Image and Data Fusion, vol. 2, No. 4, (Dec. 2011), pp. 309-328.

Samal et al., "A Feature-Based Approach to Conflation of Geospatial Sources", International Journal of Geographical Information Science, vol. 18, No. 5, (Jul.-Aug. 2004), pp. 459-489.

Song et al., "Relaxation-Based Point Feature Matching for Vector Map Conflation", Transactions in GIS, vol. 15, No. 1, (2011) pp. 43-60.

Extended European Search Report for European Application No. 23198738.9 dated Feb. 22, 2024, 12 pages.

Seth et al., "Conflation of Features", Encyclopedia of GIS: With 90 Tables, Springer, (Jan. 1, 2008), pp. 129-133.

* cited by examiner

METHOD, APPARATUS, AND COMPUTER PROGRAM PRODUCT FOR MAP DATA CONFLATION

TECHNOLOGICAL FIELD

An example embodiment of the present disclosure relates to the generation and updating of map features and objects, and more particularly, to collecting map data from various sources with various levels of reliability and temporal significance and strategically conflating the map data.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry and objects, such as signs, poles, etc. Incorrect lane geometry information can be problematic as such lane geometry may be used for route guidance and at least semi-autonomous vehicle control. Inaccurate lane geometries can reduce the effectiveness of route guidance and vehicle autonomy. Inaccurate objects can be problematic as they can be used for refining location, identifying rules and restrictions, and to help guide autonomous vehicles. The accuracy of map data including point map features and objects is important for highly automated vehicles and map data needs to be kept current.

BRIEF SUMMARY

A method, apparatus, and computer program product are provided in accordance with an example embodiment for the generation and updating of map features and objects, and more particularly, to collecting map data from various sources with various levels of reliability and temporal significance and strategically conflating the map data. Embodiments provided herein include an apparatus having at least one processor and at least one memory including computer program code with the at least one memory and computer program code being configured to, with the processor, cause the apparatus to: receive observation data associated with a geographic area; identify at least one observed object within the observation data, the at least one observed object including an observed location and an observed object type; determine at least one confidence score for the at least one observed object; estimate a similarity between the at least one observed object and at least one other observed object; merge the at least one observed object and the at least one other observed object based on a clustering algorithm and the similarity in response to the at least one confidence score satisfying a predetermined threshold; conflate the at least one observed object and the at least one other observed object to obtain a conflated object; provide for storage of the conflated object; and provide for at least one of navigational guidance or at least semi-autonomous vehicle control using the stored, conflated object.

According to some embodiments, the apparatus is further caused to aggregate observation data and align observation data with map data of the geographic area in response to receiving observation data associated with the geographic area. According to certain embodiments, the at least one confidence score includes an existence confidence score representing a likelihood of existence of the observed object at the observed location. According to certain embodiments, the at least one confidence score further includes a spatial confidence score, where the spatial confidence score reflects a likelihood of the observed location being an accurate location for the observed object. According to certain embodiments, the confidence score further includes a classification confidence score, where the classification confidence score reflects a likelihood of the observed object type being accurate. The at least one confidence score is established, in some embodiments, based at least in part on the at least one observed object and a prior state.

According to certain embodiments, the apparatus is further caused to determine a context associated with the at least one observed object, where the at least one confidence score is determined based, at least in part, on the context associated with the at least one observed object. The similarity between the at least one observed object and at least one other observed object is estimated, in some embodiments, based on a spatial distance between the at least one observed object and the at least one other observed object and attributes of the at least one observed object and the at least one other observed object. The apparatus of some embodiments is further caused to apply decay logic to the at least one observed object before causing the apparatus to estimate the similarity between the at least one observed object and the at least one other observed object.

Embodiments provided herein include a method including: receiving observation data associated with a geographic area; identifying at least one observed object within the observation data, the at least one observed object including an observed location and an observed object type; determining at least one confidence score for the at least one observed object; estimating similarity between the at least one observed object and at least one other observed object; merging the at least one observed object and the at least one other observed object based on a clustering algorithm and the similarity in response to the at least one confidence score satisfying a predetermined threshold; conflating the at least one observed object and the at least one other observed object to obtain a conflated object; providing for storage of the conflated object; and providing for at least one of navigational guidance or at least semi-autonomous vehicle control using the stored, conflated object.

The method of some embodiments further includes aggregating observation data and aligning observation data with map data of the geographic area in response to receiving observation data associated with the geographic area. According to some embodiments, the at least one confidence score includes an existence score representing a likelihood of existence of the observed object at the observed object location. According to some embodiments, the at least one confidence score further includes a spatial confidence score, where the spatial confidence score reflects a likelihood of the observed object location being an accurate location for the observed object. According to certain embodiments, the confidence score further includes a classification confidence score, where the classification confidence score reflects a likelihood of the observed object type being accurate. According to certain embodiments, the at least one confidence score is established based, at least in part, on the at least one observed object and a prior state.

The method of some example embodiments includes determining a context associated with the at least one observed object, where the at least one confidence score is determined based, at least in part, on the context associated with the at least one observed object. According to some embodiments, the similarity between the at least one observed object and the at least one other observed object is estimated based on a spatial distance between the at least one observed object and the at least one other observed object and attributes of the at least one observed object and the at least one other observed object. The method of some embodiments includes applying decay logic to the at least one observed object before estimating the similarity between the at least one observed object and the at least one other observed object.

Embodiments described herein further include a computer program product having computer-executable program code portions stored therein, the computer executable program code portions including program code instructions configured to perform any method described herein.

Embodiments provided herein further include a computer program product having at least one non-transitory computer-readable storage medium having computer executable program code portions stored therein, the computer-executable program code instructions including program code instructions to: receive observation data associated with a geographic area; identify at least one observed object within the observation data, the at least one observed object including an observed object location and an observed object type; determine at least one confidence score for the at least one observed object; estimate similarity between the at least one observed object and at least one other observed object; merge the at least one observed object and the at least one other observed object based on a clustering algorithm and the similarity in response to the at least one confidence score satisfying a predetermined threshold; conflate the at least one observed object and the at least one other observed object to obtain a conflated object; and provide for at least one of navigational guidance or at least semi-autonomous vehicle control using the stored, conflated object. The computer program product of some embodiments further includes program code instructions to aggregate observation data and align observation data with map data of the geographic area in response to receiving observation data associated with the geographic area.

Embodiments provided herein include an apparatus including: means for receiving observation data associated with a geographic area; means for identifying at least one observed object within the observation data, the at least one observed object including an observed location and an observed object type; means for determining at least one confidence score for the at least one observed object; means for estimating similarity between the at least one observed object and at least one other observed object; means for merging the at least one observed object and the at least one other observed object based on a clustering algorithm and the similarity in response to the at least one confidence score satisfying a predetermined threshold; means for conflating the at least one observed object and the at least one other observed object to obtain a conflated object; means for providing for storage of the conflated object; and means for providing for at least one of navigational guidance or at least semi-autonomous vehicle control using the stored, conflated object.

The apparatus of some embodiments further includes means for aggregating observation data and aligning observation data with map data of the geographic area in response to receiving observation data associated with the geographic area. According to some embodiments, the at least one confidence score includes an existence score representing a likelihood of existence of the observed object at the observed object location. According to some embodiments, the at least one confidence score further includes a spatial confidence score, where the spatial confidence score reflects a likelihood of the observed object location being an accurate location for the observed object. According to certain embodiments, the confidence score further includes a classification confidence score, where the classification confidence score reflects a likelihood of the observed object type being accurate. According to certain embodiments, the at least one confidence score is established based, at least in part, on the at least one observed object and a prior state.

The apparatus of some example embodiments includes means for determining a context associated with the at least one observed object, where the at least one confidence score is determined based, at least in part, on the context associated with the at least one observed object. According to some embodiments, the similarity between the at least one observed object and the at least one other observed object is estimated based on a spatial distance between the at least one observed object and the at least one other observed object and attributes of the at least one observed object and the at least one other observed object. The apparatus of some embodiments includes means for applying decay logic to the at least one observed object before estimating the similarity between the at least one observed object and the at least one other observed object.

BRIEF DESCRIPTION OF THE DRAWINGS

Having thus described example embodiments of the disclosure in general terms, reference will now be made to the accompanying drawings, which are not necessarily drawn to scale, and wherein:

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for the generation and updating of map features and objects, and more particularly, to collecting map data from various sources with various levels of reliability and temporal significance and strategically conflating the map data. Road segment paths and lane line geometry are often generated through automated means. However, manual verification and correction is often necessary due to the unique properties of roads in different and unique contexts. As such, even automated means rely heavily on manual processes that are laborious, time intensive, and costly. Because millions of miles of roads exist, the determination of road segment and lane line geometry can be a tedious process. Embodiments described herein provide a reliable manner of generating map geometry through the aggregation of data from various sources in various formats and using conflation to generate one set of map geometries that represents the real-world objects without duplication. The observations or gathered data (e.g., crowdsourced) can be represented in various formats, such as images, point clouds, extracted analytical geometries, or probe densities that could be overlapping in terms of coverage.

Map feature and object generation is complex with vast numbers of features and objects found within a geographic area from a plurality of different data sources. Point objects and features, collectively referred to herein as map objects, can be extracted from various data sources, such as probe data density images, satellite images, dash camera images, and LiDAR (light distancing and ranging) images, among others. However, the extracted map objects often include varying qualities (e.g., location accuracy, object detail, etc.) and varying levels of coverage along with varying degrees of temporal relevance. However, data from different sources can be complementary to each other with information not present in one source potentially being found in other sources. Thus, embodiments described herein aggregate and merge data from different sources in a meaningful way to produce a single map representation including map objects that are as close as possible to ground truth.

Embodiments receive observations represented in analytical geometries that are highly overlapping. For example, a point object (e.g., a telephone pole) can be observed in different source data and appear in the set of observations from different sources multiple times, each occurrence having some degree of variation to the actual position of the true object. Further, different parts of one object may occur multiple times in the observation set. Embodiments generate from this data one set of geometries which represents the real world objects without duplication. Embodiments aggregate and conflate data from different sources. Embodiments of the present disclosure employ pre-enrichment of input data, decay, association, merging, conflation, and post-enrichment to capitalize on the various data sources with an understanding of the accuracy and timeliness of the input data. The output is an accurate estimate of the location of the true object and the geometry of the map object within the map geometry.

An example data source includes map data gathered as probe data. The probe data can define various aspects of map geometry such as road segment paths, lane line geometry, object detection, traffic determination, and the like. Another data source can include satellite imagery, where object detection is performed within the images to identify objects and their respective locations. Lane geometry and lane features (e.g., lane lines, lane boundaries, curbing, etc.) can also be identified in imagery. The different sources of map data have differing degrees of accuracy and timeliness. For example, map data informed by municipalities, such as a department of transportation, may be updated only periodically, such as quarterly. However, crowd-sourced data may be available in real-time or near real-time. Map data service providers may collect map data using specialized vehicles that have a high level of sensor technology, such that these specialized vehicles may provide substantially ground truth data that is interpreted as the most accurate data available. Early, semi-autonomous vehicles that gather point cloud data such as through LiDAR (light distancing and ranging) may be received in near real-time; however, the data may be of limited accuracy due to the age of the technology or the sensor level of the vehicle.

As technology advances, the data available for collection has increased in volume, such as with location data from personal hand-held devices and vehicles. Further, data from sensors attached to located vehicles (e.g., image sensors, LiDAR, etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming.

Generating map data such as road or lane geometries, map objects, and dynamic information such as traffic directly from probe data is challenging. Probe data refers to any data containing a location (e.g., longitude and latitude, such as Global Positioning System coordinates or GNSS coordinates, cartesian coordinates, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is challenging.

Probe data is often very noisy and often sparse for less traveled roads such as residential roads. The use of analytical techniques to create road geometry struggles to create usable road geometry under sparse and noisy probe conditions, and suffers from a large number of hyper parameters that need to be tuned. Using analytical techniques to create lane geometry or paint marking geometry from probe data is practically infeasible due to the fact that consumer grade global positioning systems have a noise level that exceeds the width of a lane, and thus is ineffective at identifying the correct lane of travel.

The collection of rich sensor data from vehicles traveling within a road network, such as image data (e.g., 360-degree camera views) and LiDAR (Light Distancing and Ranging) requires expensive sensor arrays associated with vehicles traveling within a road network. While such technology is being adopted at an ever-increasing rate, this sensor data still has limited coverage relative to the total volume of roads that exist. Further, sensor data from vehicles equipped with such expansive sensor arrays may not be readily available due to the large volume of data generated requiring large bandwidth and the heightened privacy risk that raw sensor data can reveal regarding a user's whereabouts and behavior. Sensor arrays of a vehicle can differ among model years and among different manufacturers or OEMs (Original Equipment Manufacturers). These sensor arrays can include cameras, LiDAR, Radar, etc., but due to different technological configurations, data characteristics may vary between different vehicles, between different OEMs, and between model years, for instance. Hence, data received from a first sensor of a first vehicle or OEM may require different processing than data received from a second sensor of a second vehicle or OEM.

According to some embodiments, OEMs can provide a sensor message from a vehicle that describes the detection of an object as perceived by the vehicle, such that the vehicle processes the raw sensor data and communicates the detection of the object in a message with the location and a timestamp. The messages including map object information is taken as input by example embodiments described herein to be conflated. Enabling full automation of the creation of high definition (HD) maps including map objects and their respective locations from probe data provides improved HD map coverage and enhanced safety functionality. Embodiments described herein aggregate data from different sources with different levels of detail and accuracy to conflate the data and obtain a more accurate estimation of map objects than any one source of data may provide. Further, embodiments automate this map object generation to enable rapid map updates, including real-time or near real-time dynamic data, without necessitating manual input.

Figure 1:
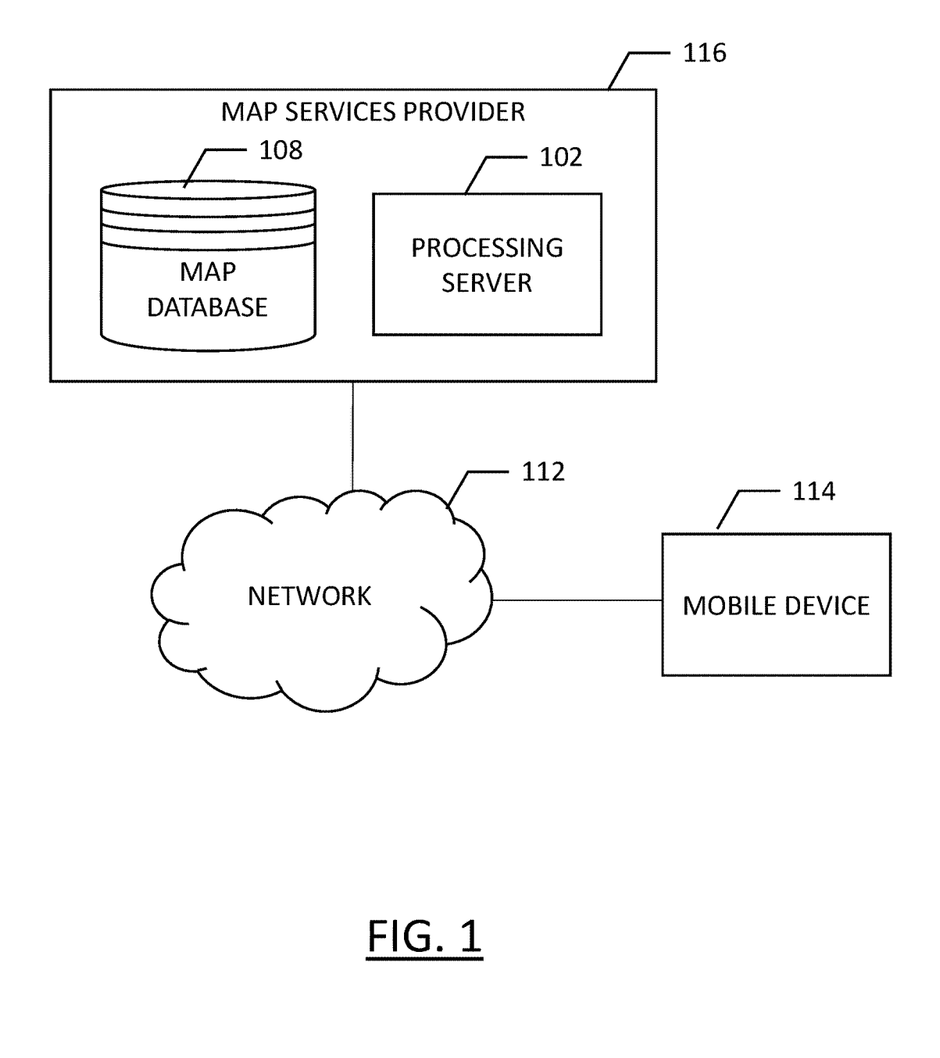
FIG. 1 illustrates a communication diagram of a system for implementing example embodiments described herein according to an example embodiment of the present disclosure.

FIG. 1 illustrates a communication diagram of an example embodiment of a system for implementing example embodiments described herein. The illustrated embodiment of FIG. 1 includes a map services provider 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map objects directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The processing server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

Figure 2:
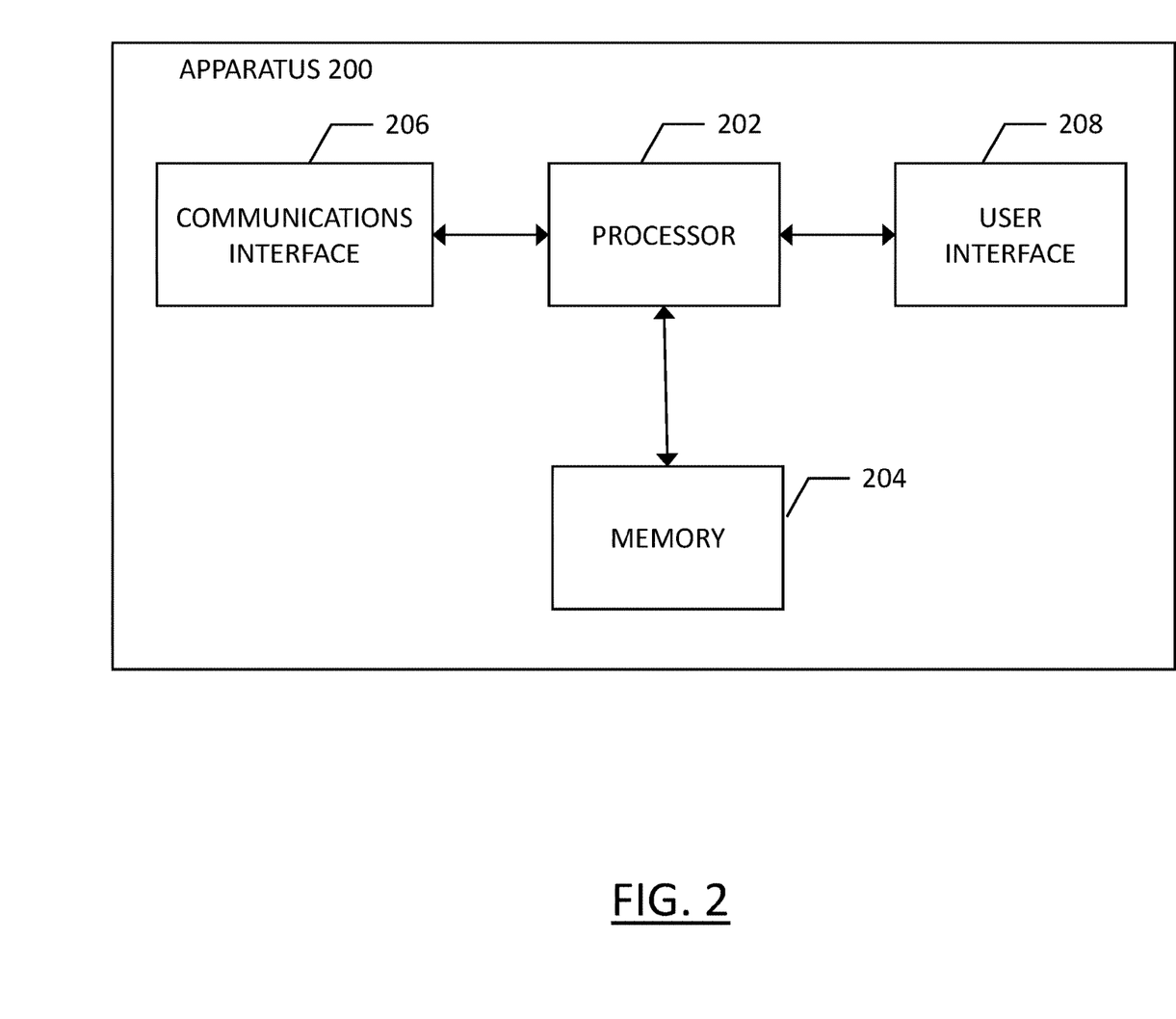
FIG. 2 is a block diagram of an apparatus for processing data from a variety of sources according to an example embodiment of the present disclosure.

An example embodiment of a processing server 102 may be embodied in an apparatus as illustrated in FIG. 2. The apparatus, such as that shown in FIG. 2, may be specifically configured in accordance with an example embodiment of the present disclosure for revising map objects based on a detailed analysis of probe data and existing map objects. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory 204, and/or the like).

Embodiments described herein generate map data from a variety of data sources that can be used for map building and healing, along with establishing dynamic map data. Embodiments aggregate data from different sources in different formats, process the map data, and conflate the data to arrive at updated map content in a consistent and automatic manner. The output is map data with an estimate of the map objects and the true object position within the map geometry.

A map data update can be triggered by a predetermined threshold, such as enough observations, there the number of observations in input data sufficient to trigger a map update may be dependent upon characteristics of the different data sources. Further, the map updates can be updated in cycles, which may be based on drives. When a sufficient number of drives are available (e.g., for a road segment or a geographic region) the conflation process may be triggered. Embodiments may be further tuned to support a freshness requirement of the map product such that an update could be triggered by any frequency needed to maintain the freshness requirement.

For map generation, different data sources are better suited to different types of data. Static map data reflects seldom-changing features, while dynamic map data reflects often-changing features in the map data. As used herein, the term static map data or substantially static map data references map data that does not regularly change, but can change over time such as when road paths change due to construction or long-term road closures. Conversely, dynamic map data references map data that changes regularly, such as traffic map data, temporary lane closures, accidents, and the like, that generally last less than a few hours. Thus, static map data can be considered map data that is persistent for twenty four hours or longer, while dynamic map data generally changes over time periods of less than twenty four hours.

Embodiments described herein perform data extraction from different data sources to obtain observations that are aggregated and conflated to establish a true position of map objects within map geometry. Data can be received in a variety of formats, such as satellite or aerial imagery, probe data, probe density histograms, or the like.

Figure 3:
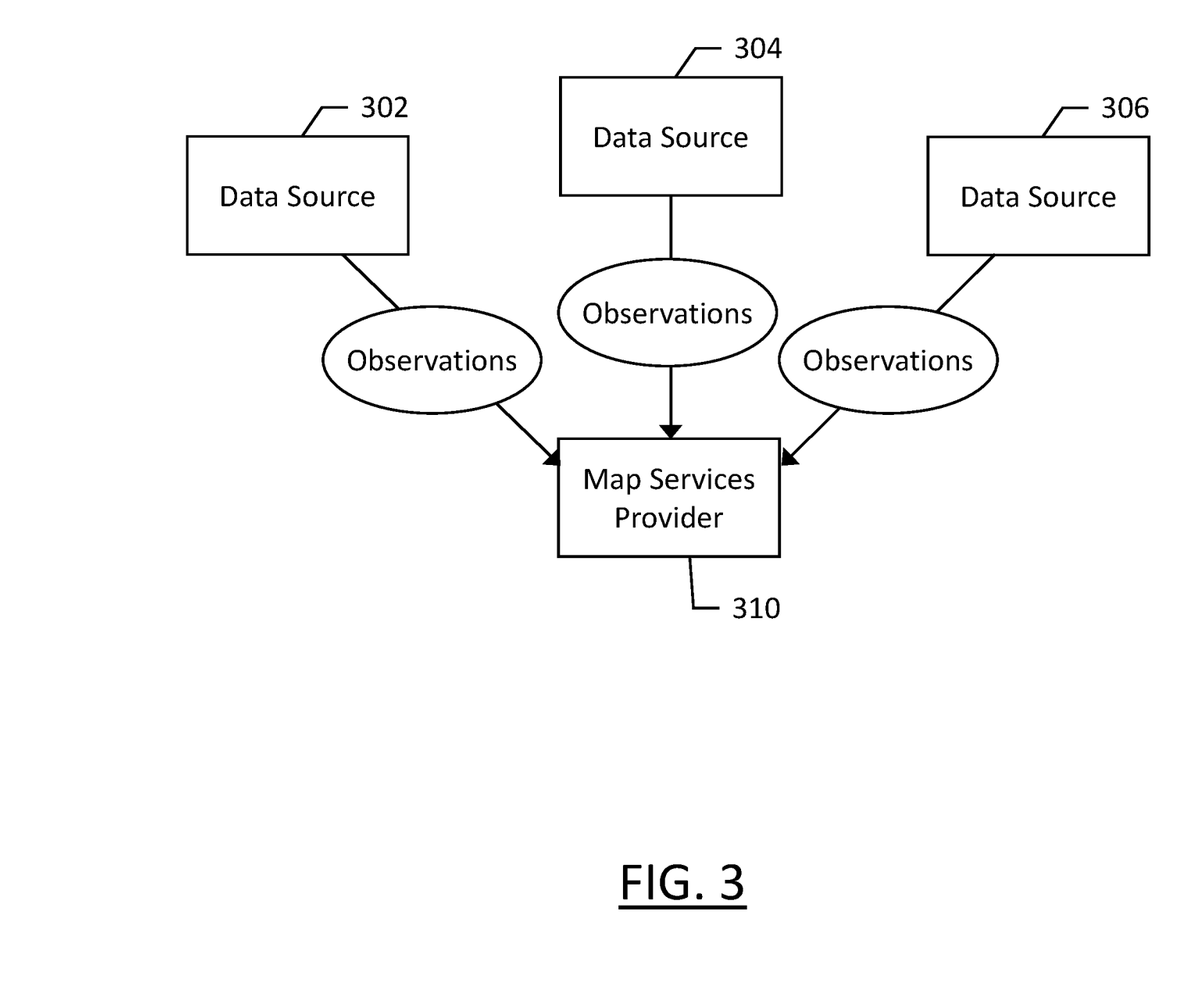
FIG. 3 illustrates aggregation of data from a variety of data sources according to an example embodiment of the present disclosure.

FIG. 3 illustrates an example embodiment in which a continuous stream of new observations are received, such as from vehicles traveling within a road network, aerial images, stationary sensors, etc. These different data sources are represented as data source 302, data source 304, and data source 306. The observations from the different data sources can be received, for example, by a map services provider 310 or other entity functioning to aggregate and conflate the observation data together with prior state map data. These different sources of data provide observations that can include different information with different levels of detail regarding a given geographic area and different temporal significances, such as real-time or periodically (hourly, daily, monthly, quarterly, etc.).

According to embodiments described herein, the data received from observations can be described by three different kinds of confidence scores: the existence confidence score, the attribute classification histogram, and the position accuracy covariance matrix. An observed map feature might be a false positive, while the existence confidence score provides the possibility that an observed map feature really exists. The same map feature may be classified into different types of object in multiple observations, while the attribute classification histogram describes the classification distribution of an attribute. For example, the shape of a road sign may be recognized in two different observations as round and as octagonal due to adverse weather conditions or lighting. This serves as an abstracted geometry characteristic from the input data. The three-dimensional position of a map feature always includes measurement errors, which are described by the position accuracy covariance matrix. However, correlation exists between a map feature and other map features in the vicinity. For example, a stop line on a road surface and a stop sign often appear together, though not always. Other map features and their attributes in the vicinity are the context of a map feature. Different types of objects may be supported by other types of objects, such as speed-bump signs preceding a painted, raised speed bump, or railroad crossing signs preceding a rail crossing, for example. Other contextual clues can include a "stop ahead" or "yield ahead" sign preceding a stop sign or a yield sign, respectively. A machine learning model can be used with these features to assign or modify confidence scores for observed objects. The confidence scores can be enriched for each point feature using its context.

The map data from multiple sources may have different delays before they are fed into the conflator. For example, sensor data from OEM fleets may arrive in near real-time, while traditional maps from map service providers may be released periodically, such as quarterly. Embodiments of the present disclosure employ decay logic to each confidence score to consider the data freshness of a map feature. The map features from different data sources are matched, merged, and conflated. The conflated map features are further enriched using their contexts. Finally, the map features are stored and used as the prior state in the next iteration of conflation.

Figure 4:
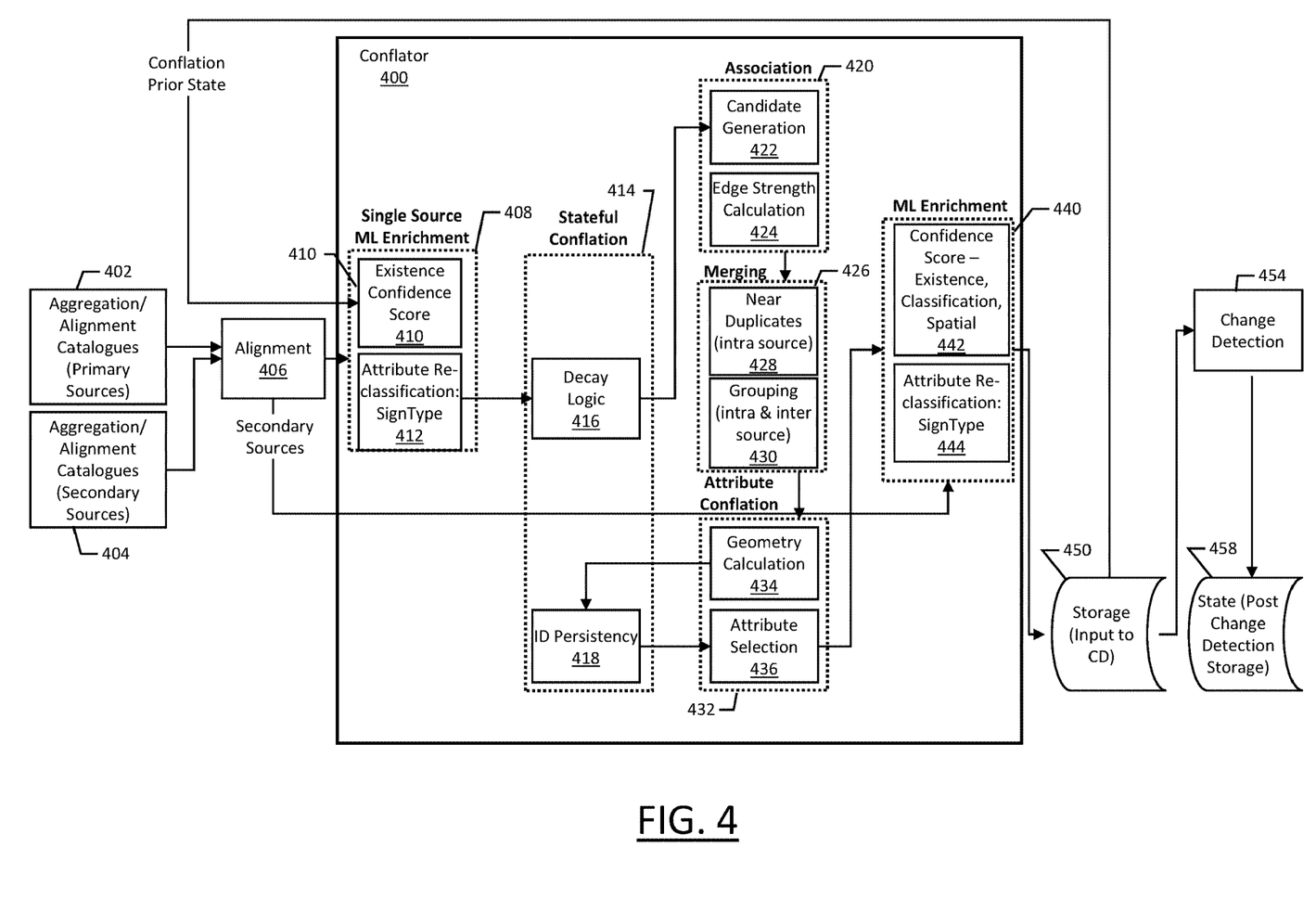
FIG. 4 illustrates a flow chart of the process of conflating observation data from a variety of data sources according to an example embodiment of the present disclosure.

FIG. 4 illustrates an example embodiment of the process described herein. As shown, data aggregation from different sources is performed in the form of aggregation/alignment catalogs from primary sources 402 and aggregation/alignment catalogs from secondary sources 404. Primary sources are sources with higher accuracy and greater reliability than secondary sources. The division between primary sources and secondary sources can be tuned according to available data and quality of data available. As sensor suites of vehicles improve, the accuracy and reliability of crowd-sourced data can become a primary source, for example. Lower accuracy sources provide enrichment to the conflated data as described below.

Alignment of the data from the primary sources and secondary sources occurs at 406 to align the data for consistency with map locations. The aligned data is fed into the conflator 400 and into the single source machine learning enrichment at 408. Using prior conflation results as the prior state reduces variation caused by conflating a small amount of map data arriving in real-time or near real-time, and thus improves the stability of the automatically conflated map. The aligned data, together with the conflation prior state of previously aggregated data is processed to identify an existence confidence score 410 and attribute re-classification 412. The existence confidence score is the likelihood of existence of an identified object. The output existence confidence is the maximum of the input existence confidences. The Existence score from aggregation is used as an input, where aggregation calculates the score with heuristics logic incorporating few attributes and count of drive passes or the count of times the drive could see the feature. The existence confidence score can be calculated using the observation count of the object relative to the number of times an object should have been observed if it is present in the reported location. A minimum number of observations may be employed to increase confidence. A distance of the observation from the object can be considered in establishing an observation.

Existence confidence as calculated for the existence confidence score at 410 establishes the likelihood that an object exists in the real world within a threshold distance of the observed location (e.g., within three meters). According to some embodiments, this metric is calculated using a machine learning model with a target variable created with presence of ground truth within a threshold distance radius. The machine learning model of example embodiments can employ an approach of deriving existence confidence or influencing existence confidence based on contextual clues. The machine learning model of an example embodiment may be a supervised machine learning and may include an XGBoost model, a LightGBM (Light Gradient Boosting Machine) model, a Scikit-Learn model, or similar models useful for fast execution speed, which with some modification can be used for classification. Contextual clues can include recognizing the presence of a stop line on a road, such that an observation of a stop sign proximate the stop line has an increased existence confidence due to the known presence of a stop line. Similarly, if a stop sign is observed along a stretch of road that has no intersections, crosswalks, or other features that would support the presence of a stop sign, the existence confidence may be low.

Classification confidence is generated at attribute re-classification operation at 412. The classification confidence output is a mean of input classification confidences in an example embodiment, using the classification score from the aggregation operation. During aggregation, classification confidence can be calculated by a count of mode divided by a sum of the count of mode and a count of unknown, with the mode being the most prominent classification (e.g., a stop sign classification, a yield sign classification, etc.). The classification confidence can be calculated with the machine learning model according to an example embodiment, such as with a model as described above. A match or mismatch of sign type between a classified sign and a ground truth sign present within a predetermined distance of the location of the classified sign can influence the classification confidence. Contextual clues can be employed in the same manner as described above with respect to the existence confidence.

Spatial confidence is the likelihood of how close or far away an object is from a ground truth position of the object. If the mean location of an observed object is at the location of the ground truth object, the spatial confidence is at a maximum (e.g., 1). If the mean location of an observed object is 20 meters or more away from the ground truth object location, the spatial confidence may be at a minimum (e.g., 0). A linear or non-linear approach may be used between the minimum and maximum spatial confidence scores. The machine learning model of example embodiments can be calibrated with the covariance matrix to bring in absolute and relative elements together in establishing the spatial confidence.

Because observations can be of objects that have a temporal component (e.g., dynamic objects move, while static objects do not move), observations are weighted based on freshness during stateful conflation at 414. The freshness of map data from various sources varies significantly. Some map data may arrive hours or minutes after measurement, while some map data may be several months old. Embodiments provided herein apply decay logic at 416 to each individual data source to enable the updating of the map in real-time while maintaining a level of quality. A basic decay logic could reduce confidence scores by half after a certain period of time. For example:

$$x(t) = x(t_0) 2^{-\frac{t-t_0}{\tau}}$$

where x(t) is the confidence score at the conflation time t, $x(t_0)$ is the initial confidence score at the measurement time $t_0$ and $\tau$ is half time, i.e., the time required for the confidence score to reduce to half of its initial value.

The observation data with the associated confidence scores as adjusted by any decay logic is then provided for association at 420. In the association operation, the similarity between two point features, both inter- and intra-source, is estimated based on their attributes (e.g., the sign shape and type) and the spatial distance between their positions. For example, an OEM sends multiple object detection messages pertaining to an object (e.g., a sign located at latitude and longitude). Intra-source comparison estimates the distances between the different messages of the same source. Inter-source comparison estimates the distances between the different messages from a first OEM compared with detection messages from a first Fleet, for example. During association, signs are associated between different sources. Candidate pairs can be created and associated information for nodes in the form of existence score, or vector representation of a node can be created during candidate generation at 422. Association entails generating candidate pairs of signs or other observed objects.

Figure 5:
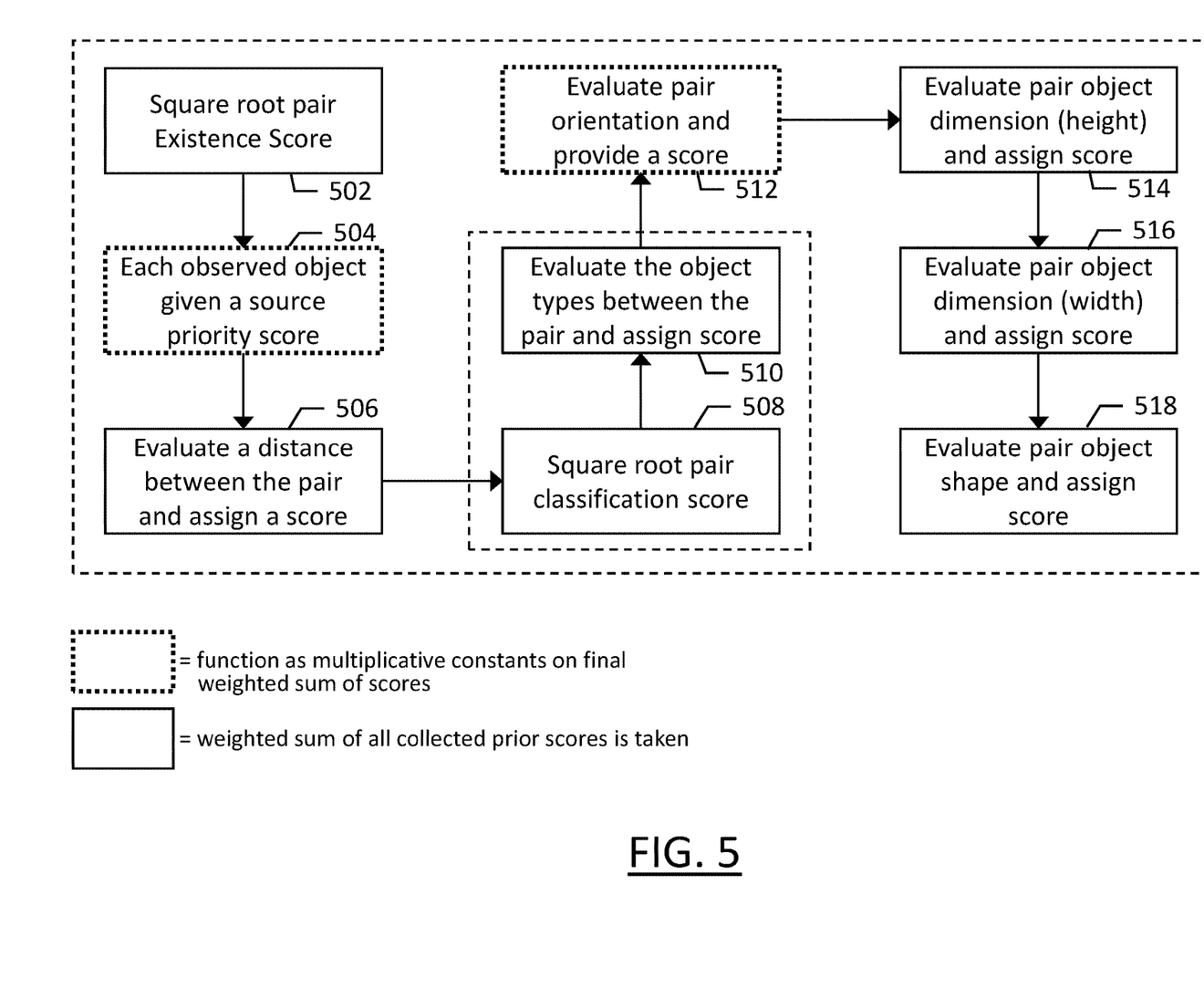
FIG. 5 illustrates edge strength calculation of the association operation according to an example embodiment of the present disclosure.

Once each candidate has two nodes through the association, the calculation of edge strength is performed at 424 to determine strength of matching attributes and distances between the two nodes or objects. The expected outcome from the edge strength calculation is assignment of an edge score for all possible candidate pairs such that algorithms in merging at 426 can group them. An example edge strength calculation is shown in FIG. 5, where a square root of the pair existence score is taken at 502, each observed object is given a source priority score at 504, and a distance between the observed object pair is evaluated at 506 to assign a score of proximity. A square root of the pair of classification scores is taken at 508 and the object types are evaluated between the pair to generate a score at 510. The pair orientation is evaluated at 512 to generate a further score. Object dimensions are evaluated for height at 514 and width at 516 where each dimension evaluation establishes a similarity score. The pair object shape is evaluated at 518 to generate a similarity score. For the elements in solid lines of FIG. 5, the weighted sum of all collected prior scores are taken, while for the dot-dot broken line objects function as multiplicative constants on a final weighted sum of scores. This process generates the edge strength similarity score shown at 424 in FIG. 4.

In the merging step at 426, the similar point features can be grouped, such as using a clustering or community detection algorithm. Once association is completed and all edge strength scores are calculated, a weighted graph is formed and clustering techniques can be applied to form a cluster of probable objects that may be merged and conflated together. Clustering techniques may be applied to group together a cluster of objects such as road signs for merging. Clustering techniques can include connected component analysis where a graph is created where each road sign is represented by a node and each edge is weighted, where the weights are represented by the score calculated in the association step. According to an example embodiment of a connected component analysis, an edge cutoff that needs to be satisfied can be added for a weighted edge to be formed between two objects (e.g., road signs). This enables strongly connected components that can be confidently conflated. If the edge strength score between two objects falls below this effective cutoff, an edge between the two nodes is not formed. Due to the implementation of the cutoff, once the construction of the graph is complete, several strongly connected graph components are identified that include nodes that can then be conflated.

Another clustering technique is a max weight matching were a matching is a subset of edges in which no node occurs more than once. The weight of a matching is the sum of the weights of its edges. Once a matching is complete, the total sum of weights of the graph are considered maximized. This approach provides a significantly different output compared to connected components or Leiden Community Detection described below as it avoids creating a local maxima edge if at the end of the matching the total sum of weights is not maximized. When observing the visual output it is possible to identify edges that should have been created but are not created as they do not maximize the total weight of the graph.

Yet another clustering technique is the Leiden Community Detection where the Leiden algorithm looks to optimize the modularity or Constant Potts Model (CPM). Designed to work on networks, Leiden has three primary operations: (1) local moving of nodes; (2) refinement of the partition; and (3) aggregation of the network based on the refined partition. These operations can be executed iteratively until no further movement of nodes across partitions is taking place. Once this is achieved, the process concludes suggesting that optimal communities within the network have been found.

Once the objects are merged in the merging operation of 426, attribute conflation is performed at 432. In the geometry calculation operation at 434, the confidence scores, attributes, and geometric positions of all point features in the same group are merged considering data source priorities. The output of the geometry calculation includes input to ID persistency at 418 of stateful conflation 414 to impart a timeliness or permanence of the object. If an object identifier persists after updates, but has changes in locations and/or confidence attributes, it has been conflated. If the object identifier is removed, the conflation determined that the object no longer exists (e.g., sign removed), or conversely, a new object identifier appears indicating that new observations point toward a new object. For example, a changed speed limit sign at the location of an old speed limit sign with a different speed. The object identifier can be, for example, a UUID (Universal Unique Identifier) of 128 bits. Attribute selection is performed at 436 for the attribute conflation. The output of the attribute conflation at 432 is input for machine learning enrichment at 440 along with aligned secondary source data used to indicate how secondary sources may interpret objects through observations to better inform the machine learning model. The existence confidence score, classification confidence score, and spatial confidence score are determined at 442 through the machine learning model, and attribute reclassification is performed at 444. The output is conflated observation data that is then stored at 450 as the current state of the map data. The current state of the map data becomes the conflation prior state when new observation data is received such that the map data is automatically updated and consistently learning. The current state of the map data is used with change detection at 454 to identify changes in the map data which informs the state of the map data stored at 458.

Using the previous conflation results as the prior state reduces variation caused by conflating a small amount of map data (relative to the map data for the area) arriving in real time and as such improves the stability of the automatically conflated map. Typically, only selected regions are updated at any given time, while different regions may be updated asynchronously, depending upon data availability of the region. As described above, map updates may be triggered by a predetermined threshold (e.g., sufficient observations), updated in cycles (e.g., based on a threshold number of drives available), or fine-tuned to maintain a freshness of the map data. Various map features in the vicinity are correlated, such as a stop sign and a stop line that often exist together. Enriching individual input data using the context improves the reliability of the confidence scores and attributes of point features. A simple enrichment model could be trained from building a graph of selected map features.

Contextual association of objects greatly improves confidence values for existence, classification, and spatial factors. An object that does not agree with the contextual surroundings may have a substantially lower likelihood of existing, may be classified incorrectly, or may have incorrect spatial position. For example, a stop sign identified 50 meters from an intersection poses a potential issue as it can be spatially incorrect (e.g., too far from the intersection), classified incorrectly (e.g., as a stop sign rather than a sign indicating a stop sign ahead), and an existence challenge. The understanding of the context, which in this case is the location of an intersection relative to an observed object, can dramatically impact the confidence scores for that observation. If the stop sign is observed and a stop line is present on the road surface, the confidence score of the observed stop sign may increase dramatically as the stop line association with the stop sign provides a contextual clue suggesting a correctly observed stop sign location. Other examples of context include a right-of-way sign on one road link, with a yield or stop sign on an intersecting road link.

Figure 6:
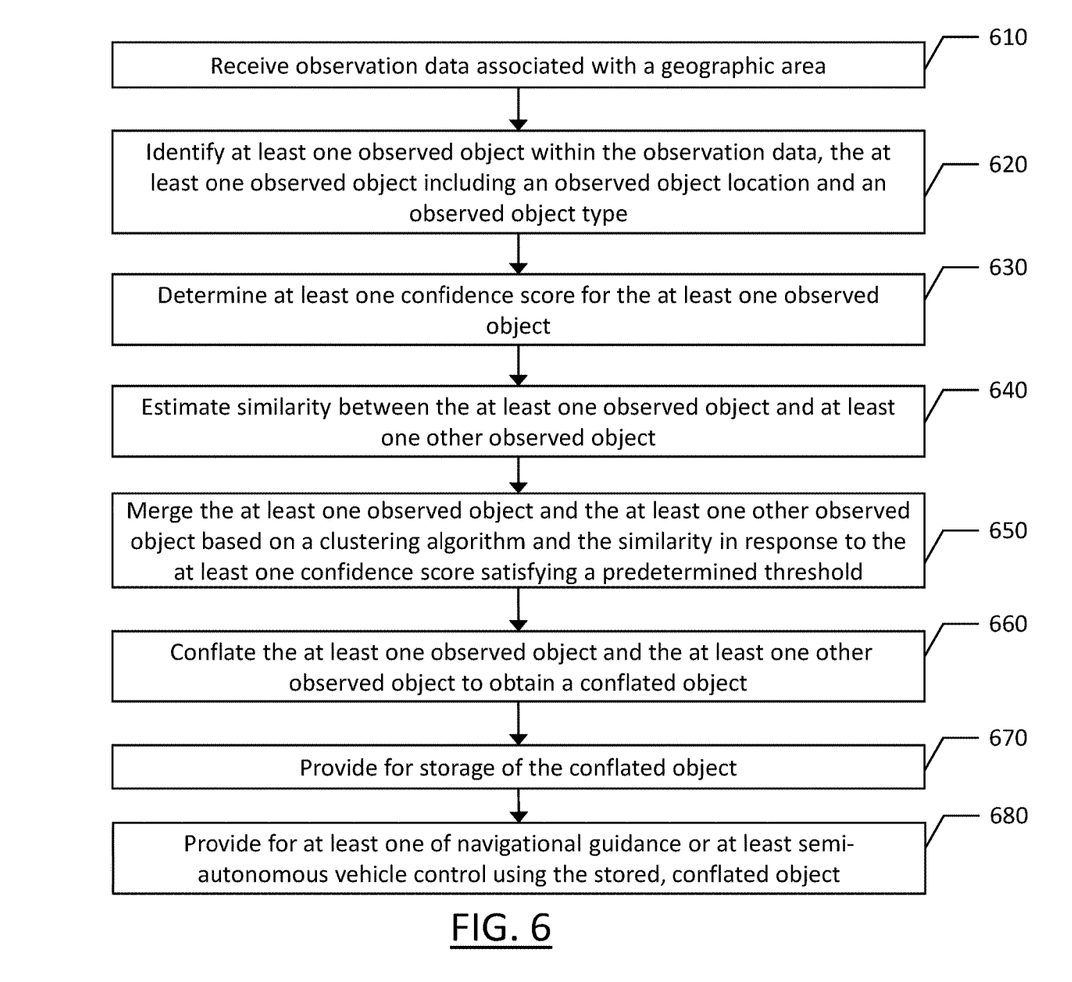
FIG. 6 is a flowchart of a method of conflating observation data from a variety of data sources according to an example embodiment of the present disclosure.

FIG. 6 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 6. The illustrated method may be performed, for example, by apparatus 200 using processor 202 with program code instructions stored in memory 204 to cause the apparatus to perform the operations of the method of FIG. 6. As shown at 610, apparatus is caused to receive observation data associated with a geographic area. At least one observed object is identified within the observation data at 620, the at least one observed object including an observed object location and an observed object type. At least one confidence score for the at least one observed object is determined at 630. A similarity is estimated at 640 between the at least one observed object and at least one other observed object. The at least one observed object and the at least one other observed object are merged at 650 based on a clustering algorithm and the similarity in response to the at least one confidence score satisfying a predetermined threshold. The at least one observed object and the at least one other observed object are conflated at 660 to obtain a conflated object. The conflated object is stored at 670, and at least one of navigational guidance or at least semi-autonomous vehicle control is provided for at 680 using the stored, conflated object. Optionally, in lieu of or in addition to providing for navigational guidance or autonomous vehicle control, the conflated object can be used in the provision of an asynchronous update of map data for a geographic region including the conflated object.

In an example embodiment, an apparatus for performing the methods of FIG. 6 above may include a processor (e.g., the processor 202) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving observation data associated with a geographic area;
   identifying at least one observed object within the observation data, the at least one observed object including an observed object location and an observed object type;
   determining at least one confidence score for the at least one observed object;
   estimating similarity between the at least one observed object and at least one other observed object;
   merging the at least one observed object and the at least one other observed object based on a clustering algorithm and the similarity in response to the at least one confidence score satisfying a predetermined threshold, wherein merging the at least one observed object and the at least one other observed object based on the clustering algorithm and the similarity comprises grouping the at least one observed object and the at least one other observed object based on the similarity using the clustering algorithm;
   conflating the at least one observed object and the at least one other observed object to obtain a conflated object in response to merging the at least one observed object and the at least one other observed object;
   providing for storage of the conflated object; and
   providing for at least one of navigational guidance or at least semi-autonomous vehicle control using the stored, conflated object.

2. The method of claim 1, further comprising:
   aggregating observation data and aligning observation data with map data of the geographic area in response to receiving observation data associated with the geographic area.

3. The method of claim 1, wherein the at least one confidence score comprises an existence confidence score representing a likelihood of existence of the at least one observed object at the observed object location.

4. The method of claim 3, wherein the at least one confidence score further comprises a spatial confidence score, wherein the spatial confidence score reflects a likelihood of the observed object location being an accurate location for the at least one observed object.

5. The method of claim 4, wherein the at least one confidence score further comprises a classification confidence score, wherein the classification confidence score reflects a likelihood of the at least one observed object type being accurate.

6. The method of claim 5, wherein the at least one confidence score is established based, at least in part, on the at least one observed object and a prior state.

7. The method of claim 1, further comprising:
   determining a context associated with the at least one observed object, wherein the at least one confidence score is determined based, at least in part, on the context associated with the at least one observed object.

8. The method of claim 1, wherein the similarity between the at least one observed object and the at least one other observed object is estimated based on a spatial distance between the at least one observed object and the at least one other observed object and attributes of the at least one observed object and the at least one other observed object.

9. The method of claim 1, further comprising:
applying decay logic to the at least one observed object before estimating the similarity between the at least one observed object and the at least one other observed object.

10. An apparatus comprising at least one processor and at least one memory including computer program code, the at least one memory and computer program code configured to, with the at least one processor, cause the apparatus to at least:
receive observation data associated with a geographic area;
identify at least one observed object within the observation data, the at least one observed object including an observed object location and an observed object type;
determine at least one confidence score for the at least one observed object;
estimate similarity between the at least one observed object and at least one other observed object;
merge the at least one observed object and the at least one other observed object based on a clustering algorithm and the similarity in response to the at least one confidence score satisfying a predetermined threshold, wherein merging the at least one observed object and the at least one other observed object based on the clustering algorithm and the similarity comprises grouping the at least one observed object and the at least one other observed object based on the similarity using the clustering algorithm;
conflate the at least one observed object and the at least one other observed object to obtain a conflated object in response to merging the at least one observed object and the at least one other observed object;
provide for storage of the conflated object; and
provide an asynchronous update of map data for a geographic region with the conflated object.

11. The apparatus of claim 10, wherein the apparatus is further caused to:
aggregate observation data and align observation data with map data of the geographic area in response to receiving observation data associated with the geographic area.

12. The apparatus of claim 10, wherein the at least one confidence score comprises an existence confidence score representing a likelihood of existence of the at least one observed object at the observed object location.

13. The apparatus of claim 12, wherein the at least one confidence score further comprises a spatial confidence score, wherein the spatial confidence score reflects a likelihood of the observed object location being an accurate location for the at least one observed object.

14. The apparatus of claim 13, wherein the confidence score further comprises a classification confidence score, wherein the classification confidence score reflects a likelihood of the observed object type being accurate.

15. The apparatus of claim 14, wherein the at least one confidence score is established based, at least in part, on the at least one observed object and a prior state.

16. The apparatus of claim 10, wherein the apparatus is further caused to:
determine a context associated with the at least one observed object, wherein the at least one confidence score is determined based, at least in part, on the context associated with the at least one observed object.

17. The apparatus of claim 10, wherein the similarity between the at least one observed object and at least one other observed object is estimated based on a spatial distance between the at least one observed object and the at least one other observed object and attributes of the at least one observed object and the at least one other observed object.

18. The apparatus of claim 10, wherein the apparatus is further caused to:
apply decay logic to the at least one observed object before causing the apparatus to estimate the similarity between the at least one observed object and the at least one other observed object.

19. A computer program product comprising at least one non-transitory computer-readable storage medium having computer-executable program code instructions stored therein, the computer-executable program code instructions comprising program code instructions to:
receive observation data associated with a geographic area;
identify at least one observed object within the observation data, the at least one observed object including an observed object location and an observed object type;
determine at least one confidence score for the at least one observed object;
estimate similarity between the at least one observed object and at least one other observed object;
merge the at least one observed object and the at least one other observed object based on a clustering algorithm and the similarity in response to the at least one confidence score satisfying a predetermined threshold, wherein merging the at least one observed object and the at least one other observed object based on the clustering algorithm and the similarity comprises grouping the at least one observed object and the at least one other observed object based on the similarity using the clustering algorithm;
conflate the at least one observed object and the at least one other observed object to obtain a conflated object in response to merging the at least one observed object and the at least one other observed object;
provide for storage of the conflated object; and
provide for at least one of navigational guidance or at least semi-autonomous vehicle control using the stored, conflated object.

20. The computer program product of claim 19, further comprising program code instructions configured to:
aggregate observation data and align observation data with map data of the geographic area in response to receiving observation data associated with the geographic area.

* * * * *